No. 862,288. PATENTED AUG. 6, 1907.
H. O. SMITH.
SUBMARINE TUNNEL.
APPLICATION FILED MAR. 19, 1907.
2 SHEETS—SHEET 1.
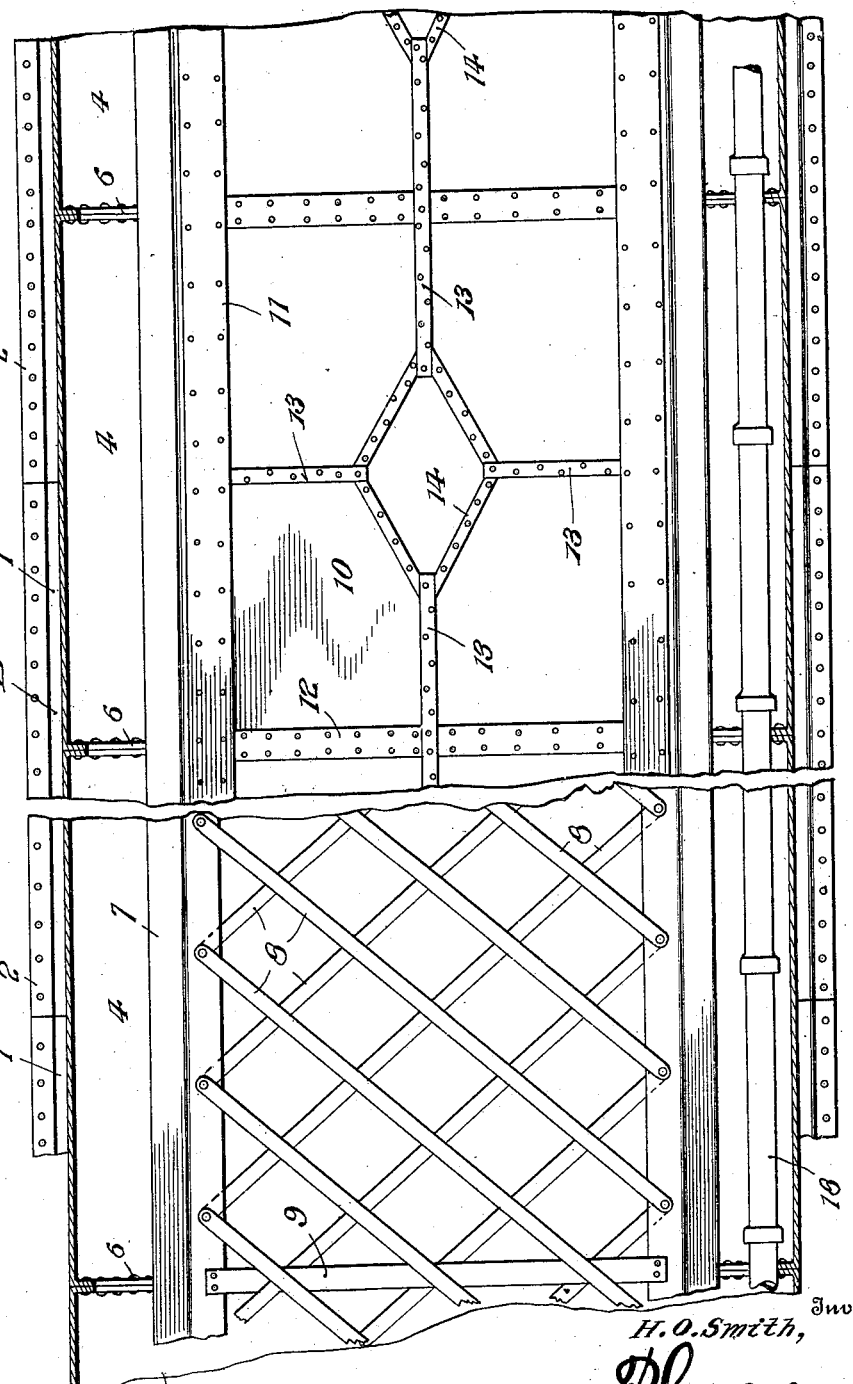

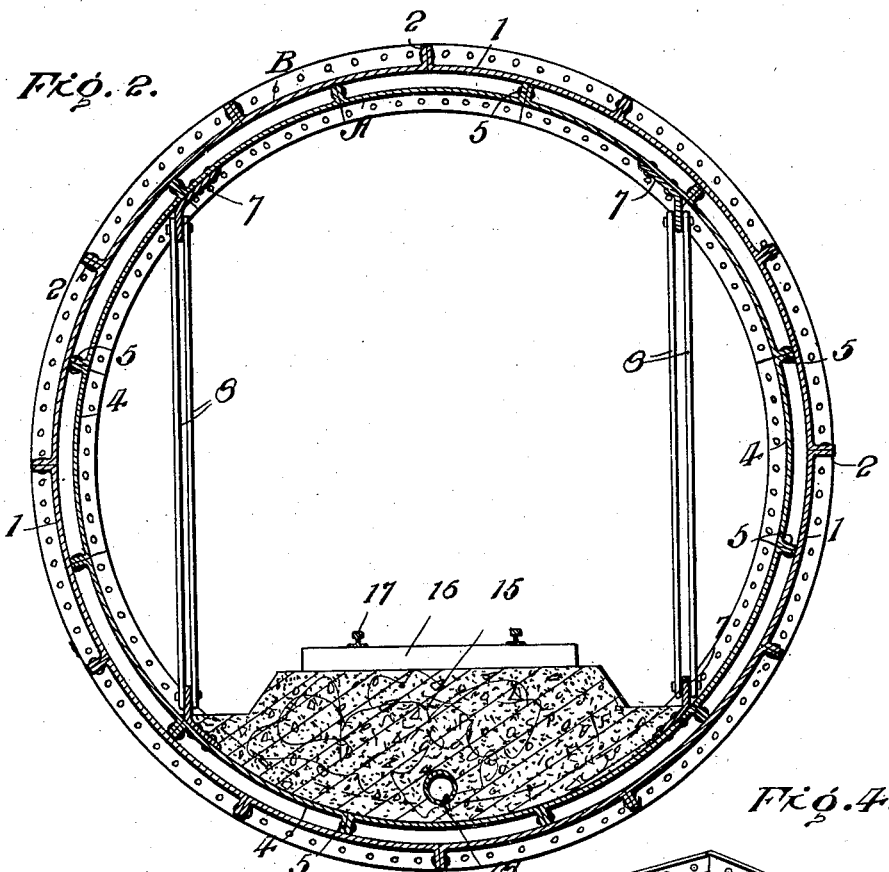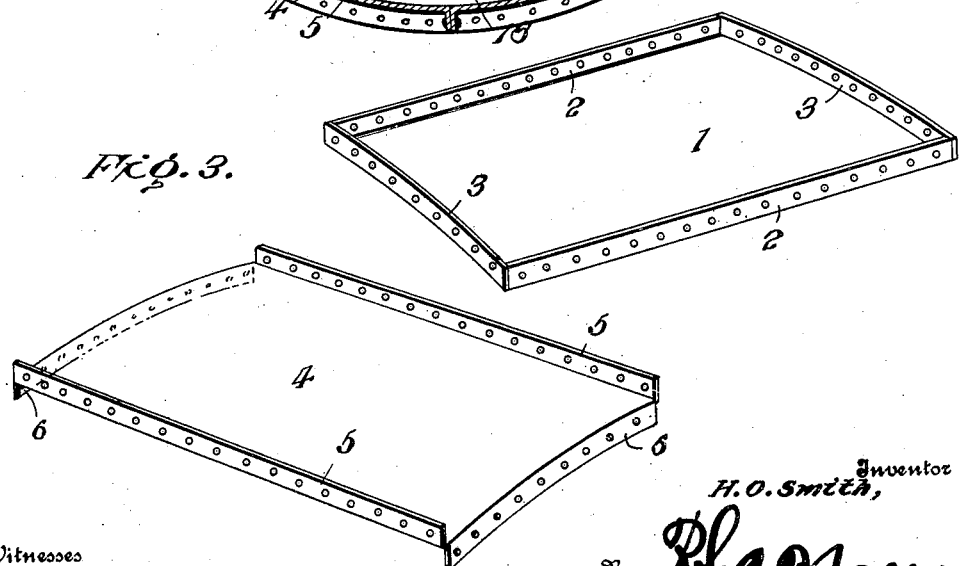

UNITED STATES PATENT OFFICE.

HANFORD O. SMITH, OF LEXINGTON, NEBRASKA.

SUBMARINE TUNNEL.

No. 862,288.      Specification of Letters Patent.      Patented Aug. 6, 1907.

Application filed March 19, 1907. Serial No. 363,226.

*To all whom it may concern:*

Be it known that I, HANFORD O. SMITH, a citizen of the United States, residing at Lexington, in the county of Dawson and State of Nebraska, have invented certain new and useful Improvements in Submarine Tunnels, of which the following is a specification.

This invention contemplates certain new and useful improvements in that class of submarine tunnels that embody tubes adapted to be put together on shore in the required lengths and floated to the place where they are to be laid and then submerged in the river or other stream and held suspended at the desired depth, and the invention has for its object an improved construction of suspension submarine tunnel of this character which will embody characteristics of extreme lightness and strength or durability, as well as practicability.

With this and other objects in view as will more fully appear as the description proceeds, the invention consists in certain constructions, and arrangements of parts which I shall hereinafter fully describe and then point out the novel features in the appended claims.

For a full description of the invention and the merits thereof and also to acquire a knowledge of the details of construction of the means for effecting the result, reference is to be had to the following description and accompanying drawings, in which:

Figures 1 and 1ª are longitudinal sectional views of a portion of a submarine tunnel embodying the novel features of my invention; Fig. 2 is a transverse sectional view thereof; and, Figs. 3 and 4 are detail perspective views of the plates for the inner and outer tubes, respectively.

Corresponding and like parts are referred to in the following description and indicated in all the views of the drawings by the same reference characters.

My improved suspension submarine tunnel embodies inner and outer tubes A and B. The outer tube B comprises a series of steel or similar plates 1 that are slightly curved in cross section and that are provided with outwardly turned edge flanges 2, the abutting flanges being riveted together, so as to constitute a cylinder. The required length is obtained by forming the said plates 1 with outwardly extending end flanges 3 riveted together as shown, so that the tube may be said to consist of an integral structure composed of a series of cylinders riveted together end to end. The inner tube A also comprises a series of similar plates 4 riveted together at their side edge flanges 5, said flanges extending outwardly and in contact with the inner walls of the plates 1, and the series of cylinders to form the inner tube are riveted together end to end by means of inturned end flanges 6 of the said plates 4. It is to be particularly noted that the joints constituted by the flanges break joint, with respect to the two tubes A and B considering both the end flanges and longitudinal flanges.

The inner tube A is provided, preferably at four equidistant points on its interior wall, with angular metallic sills 7 which extend longitudinally as shown and which have one member riveted to the plates 4 while the other member extends outwardly therefrom, preferably in a vertical plane as shown best in the cross sectional view. To the upper and lower sills braces are connected. These may be in the form of lattice-work, as indicated in Fig. 1, such lattice-work embodying diagonally extending intersecting braces 8 secured at their ends to the opposite sides of the inwardly extending members of the sills so as to form an inner and outer series of diagonal braces, and vertical braces 9 are located at intervals, preferably at every two flanges 6. If desired, I may use either in connection with or as a substitute for the lattice bracing, a bracing consisting of plates or sheathing of sheet steel or the like, as indicated in Fig. 1ª. The said plates are connected to the upper and lower sills 7 by means of longitudinally extending riveted binding strips 11 and vertically extending binding strips 12. In addition to the strips 11 and 12, the sheathing is braced by means of four auxiliary strips 13 extending inwardly toward each other from the binding strips, said auxiliary strips 13 being connected at their ends, by means of a diamond shaped series of strips 14.

If desired, my improved suspension submarine tunnel may contain a road-bed 15 formed of concrete or similar material and supporting the railway ties 16 and rails 17. One or more longitudinally extending drains 18 may be located in the road-bed 15 or at the bottom of the tube, such drain pipe being adapted to be connected to a pump so that the accumulation of water in the tube may be drawn off.

In the practical operation or installation of my improved submarine tunnel, it is intended that the tubes be put together on the shore in such lengths as may be desired or required, and the two ends to be connected together may be sealed with temporary water tight bulk heads. The tubes are then launched and floated to the desired point and then sunk by admitting water through the bulk heads, and they are then swung to the proper position and the adjacent ends secured together by divers. The ends of the outer tube would be the only ones necessary to secure in this way. The inner tube may be pumped out after all are in place and the work of joining the tubes completed and all other inside work done.

From the foregoing description in connection with the accompanying drawings, it is evident that I have provided an improved submarine tunnel which may be constructed at a much lower cost than under the ordinary system of tunneling under channels, as air locks and their accompanying expense and dangers are entirely done away with.

It is proposed that the displacement or buoyancy of the tunnel shall be in excess of its weight, this varying, of course, according to the size and thickness of the shell. In any event, however, as the buoyancy is in excess of its weight, such excess being greater than the dead weight the tube is called upon to carry, the strain will consequently be chiefly in an upright direction towards the surface. It will also be seen that by the construction hereinbefore described, with the double shell and inside bracing, my invention provides a tube which will remain rigid and steady under the force and vibration of the moving load and still have a large factor of safety in reserve. The tunnel may be suspended at any desired depth, but it is, of course, essential that it be located at such a depth below the surface of a navigable channel as to interfere in no wise with marine traffic, while at the same time avoiding the necessity of going below the bottom of the channel.

It is manifest that my invention is not limited to the arrangement of road-bed herein described and shown, as the tunnel may be used to convey water or for other purposes of such nature and under such circumstances it may be of a more simple construction, as some or perhaps all of the bracing might be done away with.

It is to be understood that my invention is not limited to any particular form of bracing.

Having thus described the invention, what is claimed as new is:

1. A submarine tunnel consisting of inner and outer tubes each of which embodies a series of plates with side and end flanges riveted together, the side and end flanges of the inner tube breaking joint with those of the outer tube.

2. A submarine tunnel of the character described, consisting of inner and outer tubes, the outer tube embodying a series of transversely curved plates provided with outstanding end and side flanges riveted together, the inner tube embodying a series of similar plates formed with outwardly extending riveted together flanges abutting against the inner walls of the outer plates and with inwardly extending end flanges, the said end flanges of the inner tube breaking joint with the said flanges of the outer tube.

In testimony whereof I affix my signature in presence of two witnesses.

HANFORD O. SMITH. [L. S.]

Witnesses:
H. D. SMITH,
HARRY F. SMITH.